(12) United States Patent
Cudmore et al.

(10) Patent No.: US 10,506,766 B2
(45) Date of Patent: Dec. 17, 2019

(54) MODULAR COMPOSTING GARDEN CONTAINER, SYSTEM, AND METHOD OF USE

(71) Applicants: Colin Cudmore, Bloomington, IN (US); Joel Bauchat Grant, Carmel, IN (US)

(72) Inventors: Colin Cudmore, Bloomington, IN (US); Joel Bauchat Grant, Carmel, IN (US)

( * ) Notice: Subject to any disclaimer, the term of this patent is extended or adjusted under 35 U.S.C. 154(b) by 467 days.

(21) Appl. No.: 15/406,231

(22) PCT Filed: Jul. 9, 2015

(86) PCT No.: PCT/US2015/039628
§ 371 (c)(1),
(2) Date: Jan. 13, 2017

(87) PCT Pub. No.: WO2016/010795
PCT Pub. Date: Jan. 21, 2016

(65) Prior Publication Data
US 2018/0220593 A1    Aug. 9, 2018

Related U.S. Application Data

(60) Provisional application No. 62/024,741, filed on Jul. 15, 2014.

(51) Int. Cl.
*A01G 9/02* (2018.01)
*C05F 17/02* (2006.01)
(Continued)

(52) U.S. Cl.
CPC .............. *A01G 9/023* (2013.01); *A01C 21/00* (2013.01); *A01G 7/00* (2013.01); *A01G 9/0295* (2018.02);
(Continued)

(58) Field of Classification Search
CPC ......... A01G 7/00; A01G 9/023; A01G 9/0295
(Continued)

(56) References Cited

U.S. PATENT DOCUMENTS 4,216,617 A * 8/1980 Schmidt ................. A01G 31/06
47/62 A
4,756,120 A * 7/1988 Arledge ................. A01G 31/06
47/59 R
(Continued)

*Primary Examiner* — Tien Q Dinh
*Assistant Examiner* — Ebony E Evans
(74) *Attorney, Agent, or Firm* — Roberts IP Law; John Roberts

(57) ABSTRACT

Provided is an expandable, modular tower planter having an internal vertical composting capability, and a method of assembling and using the same. Provided in various example embodiments is a modular composting garden container system comprising a base and a plurality of stackable rings forming a tower upon the base, including an optional base ring specially sized, shaped, and positioned to connect the tower to the base. A plurality of perforated, stackable tube sections are provided that are removably assembled into a compost tube assembly of selectable height and mounted within the interior of the tower and above the base. A plurality of holding struts are sized, shaped, and positioned to removably connect the compost tube assembly with the tower and to securely locate the compost tube assembly relative to the tower. Means are provided for recovering nutrient-rich drainage and selective recovery of compost material for reintroduction into the system.

6 Claims, 21 Drawing Sheets

(51) Int. Cl.
 A01G 9/029 (2018.01)
 A01C 21/00 (2006.01)
 A01G 7/00 (2006.01)
 B65D 21/02 (2006.01)
 C05F 9/02 (2006.01)
 C05F 17/00 (2006.01)

(52) U.S. Cl.
 CPC ..... *B65D 21/0215* (2013.01); *B65D 21/0235* (2013.01); *C05F 9/02* (2013.01); *C05F 17/0009* (2013.01); *C05F 17/0205* (2013.01); *C05F 17/0211* (2013.01); *C05F 17/0247* (2013.01); *C05F 17/0258* (2013.01); *C05F 17/0276* (2013.01)

(58) Field of Classification Search
 USPC ............ 47/66.6, 66.7, 82, 83; 119/66.5, 6.7
 See application file for complete search history.

(56) References Cited

U.S. PATENT DOCUMENTS

| | | | | |
|---|---|---|---|---|
| 5,428,922 | A * | 7/1995 | Johnson | A01G 9/023 47/62 R |
| 6,612,073 | B1 | 9/2003 | Powell | |
| 7,043,877 | B1 * | 5/2006 | Jensen | A01G 9/023 47/82 |
| 9,918,436 | B2 * | 3/2018 | Cudmore et al. | A01G 9/023 |
| 2008/0216403 | A1 * | 9/2008 | Schmidt | A01G 9/023 47/83 |
| 2013/0061521 | A1 * | 3/2013 | Cudmore | A01G 9/023 47/83 |

\* cited by examiner

MODULAR COMPOSTING GARDEN CONTAINER, SYSTEM, AND METHOD OF USE

CROSS-REFERENCE TO RELATED APPLICATIONS

The present application claims priority to, incorporates herein by reference, and is a non-provisional of co-pending U.S. Patent Application No. 62/024,741, filed Jul. 15, 2014. The present application also claims priority to, incorporates herein by reference, and is a 371 international of PCTUS1539628, filed Jul. 9, 2015.

FEDERALLY SPONSORED RESEARCH OR DEVELOPMENT

None.

TECHNICAL FIELD

This invention relates to gardening, and in particular, to container gardening in the form of a garden tower planter with an internal vertical composting tube.

BACKGROUND

Container gardening is well known. Almost any plant can be grown in a container when proper growing conditions are provided. Plants can be grown in anything that will hold soil and allow proper drainage. The criteria used for selecting containers typically include making sure that the container has a hole for adequate drainage and that the container is large enough to hold the minimum amount of soil required for mature plants to grow in. The biggest disadvantages to growing plants in containers are the maintenance requirements of watering and fertilizing.

SUMMARY

Provided is a novel gardening planter that elegantly overcomes the problems of the prior art and provides other advantages in the form of an expandable, modular tower planter having an internal vertical composting capability. Provided in various example embodiments is a hollow, vertical, outer cylindrical barrel with a plurality of openings formed about its cylindrical side. Also provided in various example embodiments is a hollow inner cylindrical tube having a plurality of perforations formed in its cylindrical wall. The space between the inner tube and barrel wall may be sized, shaped, and positioned to be filled with growing medium such as potting soil. The inner tube may be sized, shaped, and positioned to be filled with compost material. A plurality of worms may be added to the inner tube compost material. Water may be added to the inner tube and barrel on a daily basis, for example. Plants may be inserted into the outer barrel side openings. A removable container may be placed at the bottom of the tube and barrel, said container sized, shaped, and positioned to capture water draining out from the tube and barrel. The drainage water will typically be nutrient-rich and may be poured back into the inner tube, for instance on a daily basis. In this way a portion of the compost material may be converted into organic "worm tea" fertilizer to quickly grow healthy plants. Provided in various example embodiments is an interior vertical perforated chamber within a vertical exterior chamber within which garden plants may be grown. The interior chamber may generate compost, which may be recovered and used in this or other planting environments.

The present modular composting garden container, system, and method of use provides various improvements over Applicant's prior garden tower, described in co-pending application U.S. patent application Ser. No. 13/606,803. Applicant's prior garden tower provides an outer cylindrical barrel with a compost tube concentrically positioned within the barrel interior. The barrel and tube, as disclosed, were one size. The present garden tower embodiments provide a system of modular barrel and tube sections, which may be stacked to provide different sized garden towers. The various sections may also be disassembled and nested together in compact stacks that greatly reduce the volume of the system for more efficient packaging, shipping, storage, and retail display.

Provided in various example embodiments is a modular composting garden container system, comprising: a base; a plurality of stackable rings sized, shaped, and positioned to be removably assembled into a tower of selectable height and mounted above the base, the tower comprising a first interior sized, shaped, and positioned to hold soil introduced from a top of the tower, and a first exterior surface defining first apertures therein sized, shaped, and positioned to facilitate the growth of plants there through from the first interior; a plurality of stackable tube sections sized, shaped, and positioned to be removably assembled into a compost tube assembly of selectable height and mounted within the first interior of the tower and above the base, the compost tube assembly comprising a second interior sized, shaped, and positioned to hold compost material introduced from a top of the compost tube assembly, and a second exterior surface defining second apertures therein sized, shaped, and positioned to facilitate the passage of worms there-through from the second interior; a plurality of holding struts sized, shaped, and positioned to removably connect the compost tube assembly with the tower and to securely locate the compost tube assembly relative to the tower; wherein the base is sized, shaped, and positioned to receive, store, and provide access to nutrient-rich drainage from the soil or the compost material or both. In various example embodiments the base comprises a removable drawer sized, shaped, and positioned to receive, store, and provide access to nutrient-rich drainage from the soil or the compost material or both. Various example embodiments may further comprise a screen element removably installed in the base below the bottom of the modular compost tube assembly. Various example embodiments may further comprise a bottom ring sized, shaped, and positioned to connect the tower with the base, and the bottom ring may be sized, shaped, and positioned to connect the compost tube assembly with the base. Various example embodiments may further comprise a plurality of legs sized, shaped, and positioned to be connected with and extend radially outward from the base. Various example embodiments may further comprise a cap sized, shaped, and positioned to be removably attached with and cover a top of the compost tube assembly.

Also provided in various example embodiments is a modular composting garden container, comprising: a base; a plurality of stackable rings removably assembled into a tower of selectable height and mounted above the base, the tower comprising a first interior sized, shaped, and positioned to hold soil introduced from a top of the tower, and a first exterior surface defining first apertures therein sized, shaped, and positioned to facilitate the growth of plants there-through from the first interior; a plurality of stackable tube sections removably assembled into a compost tube assembly of selectable height and mounted within the first interior of the tower and above the base, the compost tube assembly comprising a second interior sized, shaped, and positioned to hold compost material introduced from a top of the compost tube assembly, and a second exterior surface defining second apertures therein sized, shaped, and positioned to facilitate the passage of worms there-through from the second interior; a plurality of holding struts removably connecting the compost tube assembly with the tower and securely locating the compost tube assembly relative to the tower; wherein the base is sized, shaped, and positioned to receive, store, and provide access to nutrient-rich drainage from the soil or the compost material or both. In various example embodiments the base may further comprise a removable drawer sized, shaped, and positioned to receive, store, and provide access to nutrient-rich drainage from the soil or the compost material or both. Various example embodiments may further comprise a screen element removably installed in the base below the bottom of the modular compost tube assembly. Various example embodiments may further comprise a bottom ring connecting the tower with the base. Various example embodiments may further comprise the bottom ring connecting the compost tube assembly with the base. Various example embodiments may further comprise a plurality of legs connected with and extending radially outward from the base. Various example embodiments may further comprise a cap removably attached with and covering a top of the compost tube assembly.

Provided in various example embodiments is a method of using a modular composting garden container system, comprising the steps of: removably assembling a plurality of stackable rings adapted into a tower of selectable height and mounting the tower above a base, the tower comprising a first interior sized, shaped, and positioned to hold soil introduced from a top of the tower, and a first exterior surface defining first apertures therein sized, shaped, and positioned to facilitate the growth of plants there-through from the first interior; removably assembling a plurality of stackable tube sections into a compost tube assembly of selectable height and mounting the compost tube assembly within the first interior of the tower and above the base, the compost tube assembly comprising a second interior sized, shaped, and positioned to hold compost material introduced from a top of the compost tube assembly, and a second exterior surface defining second apertures therein sized, shaped, and positioned to facilitate the passage of worms there-through from the second interior; and removably connecting the compost tube assembly with the tower and securely locating the compost tube assembly relative to the tower with a plurality of holding struts. Various example embodiments may further comprise connecting the tower with the base with a bottom ring sized, shaped, and positioned to interface with the tower and the base. Various example embodiments may further comprise connecting the compost tube assembly with the base with a bottom ring sized, shaped, and positioned to interface with the compost tube assembly and the base. Various example embodiments may further comprise substantially filling the first interior with soil; placing compost material in the second interior; placing worms in the second interior; planting a plurality of plants in the soil through the first apertures; and adding water to the soil or the compost material or both. Various example embodiments may further comprise removing from the base nutrient-rich drainage from the soil or the compost material or both; and adding the nutrient-rich drainage back to the soil or the compost material or both. Various example embodiments may further comprise removing a screen element from the base; and causing at least a portion of the compost material to exit the compost tube assembly through a bottom of the compost tube assembly.

The foregoing summary is illustrative only and is not meant to be exhaustive or limiting. Other aspects, objects, and advantages of various example embodiments will be apparent to those of skill in the art upon reviewing the accompanying drawings, disclosure, and appended claims.

DETAILED DESCRIPTION OF EXAMPLE EMBODIMENTS

Reference will now be made in detail to some specific example embodiments, including any best mode contemplated by the inventor. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments may be implemented without some or all of these features or specific details. In other instances, components and procedures well known to persons of skill in the art have not been described in detail in order not to obscure inventive aspects.

Various techniques and mechanisms will sometimes be described in singular form for clarity. However, it should be noted that some embodiments may include multiple iterations of a technique or multiple components, mechanisms, and the like, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described.

Further, the example techniques and mechanisms described herein will sometimes describe a connection, relationship or communication between two or more items or entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 21:
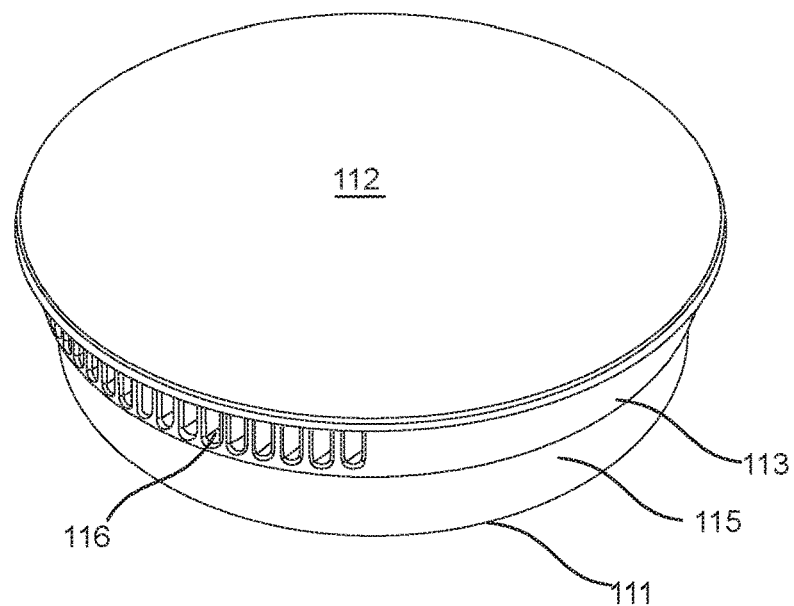
FIG. 21 is a perspective view of an example center tube cap according to various example embodiments.

Referring now in detail to the drawings wherein like elements are indicated by like numerals, there is shown an example modular composting garden container and system in the form of a garden tower 1 comprised of a modular vertical outer cylindrical barrel assembly 10 with a modular inner concentric perforated cylindrical compost tube assembly 80. See FIGS. 1-5. The modular barrel assembly 10 may be comprised of a base 20, a bottom ring 40 resting on said base, and one or more upper rings 60 stacked on said bottom ring 40. Alternatively, upper rings 60 may be sized, shaped, and positioned to sit directly on base 20 without a separate bottom ring 40. The modular compost tube assembly 80 may be comprised of a plurality of tube sections 90 (FIG. 18) and, in certain embodiments, a cap 110 (FIG. 21). The modular barrel assembly 10 may have a bottom 11 and a top 12, and may be formed into a generally cylindrical shape (for instance as shown in the Figures), the longitudinal axis of said modular barrel assembly 10 extending from the center of the bottom 11 to the center of the top 12. The modular barrel assembly 10 may have one or more sidewalls 13 formed by said rings 40, 60. The modular barrel assembly top 12, bottom 11, and sidewalls 13, define therein a barrel assembly interior 14. The modular compost tube assembly 80 may be concentrically positioned within the barrel assembly interior 14.

Figure 1:
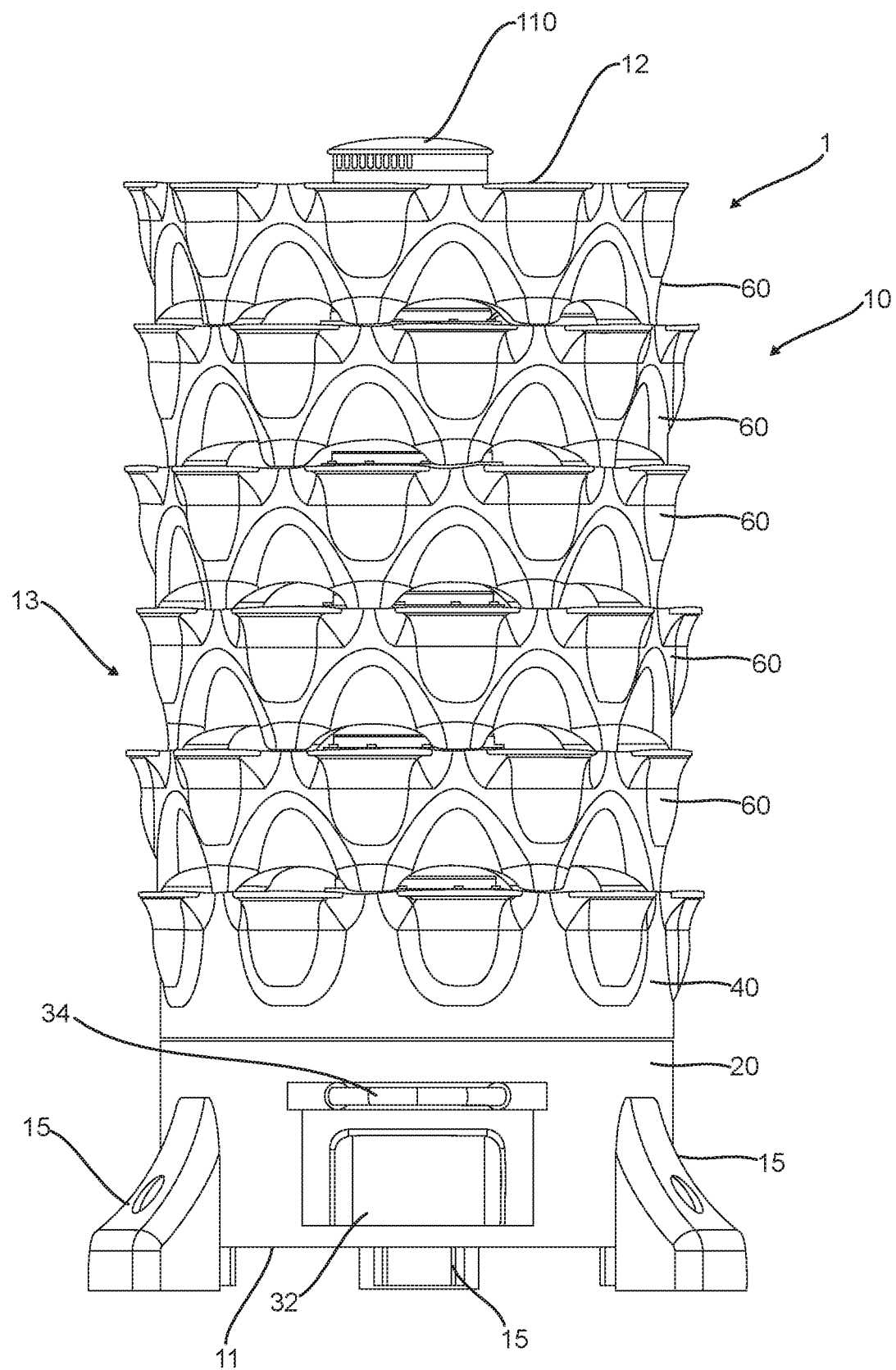
FIG. 1 is a front elevation view of an example garden container and system according to various example embodiments.
Figure 2:
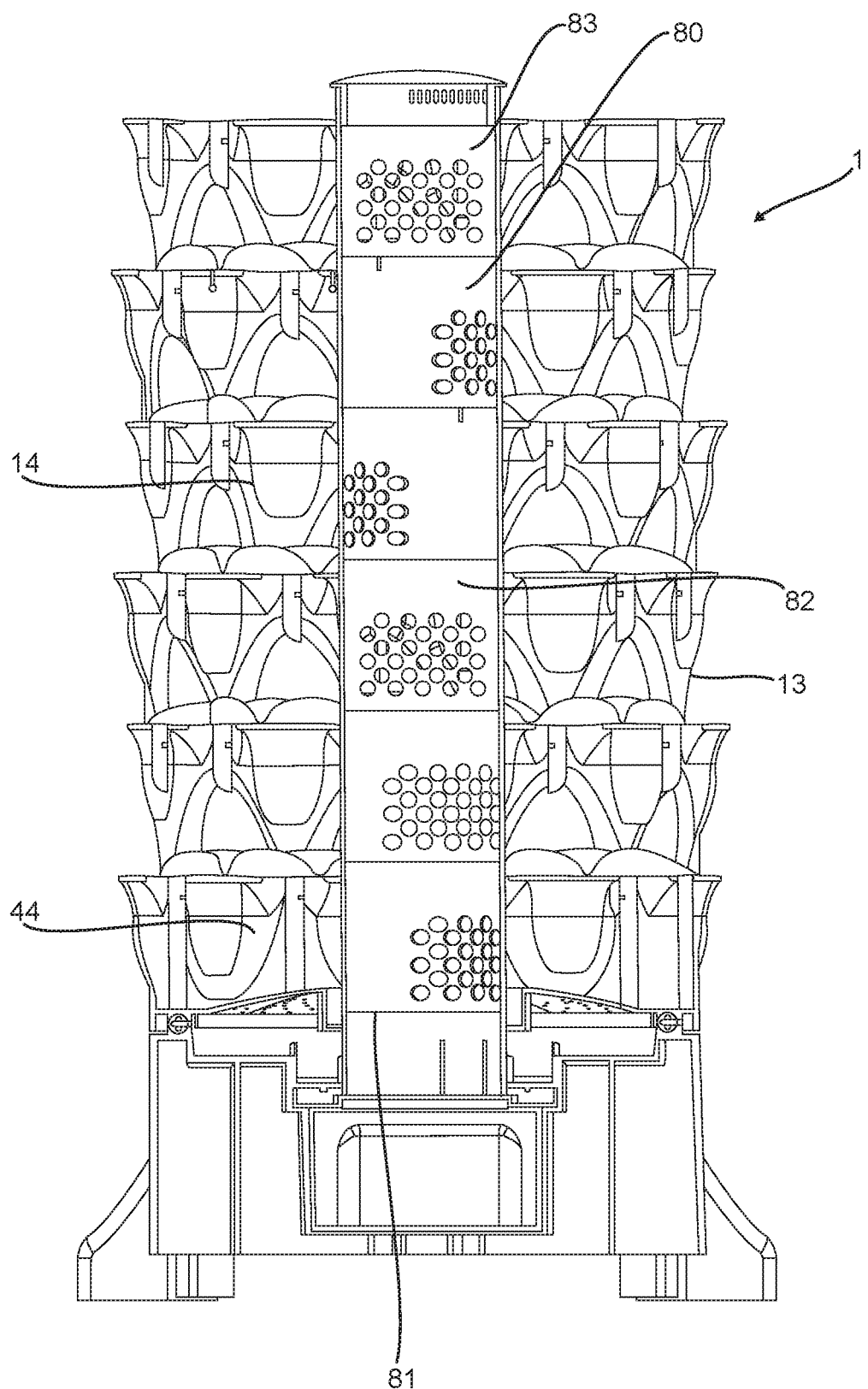
FIG. 2 is a cross-sectional view of the example garden container of FIG. 1.
Figure 3A:
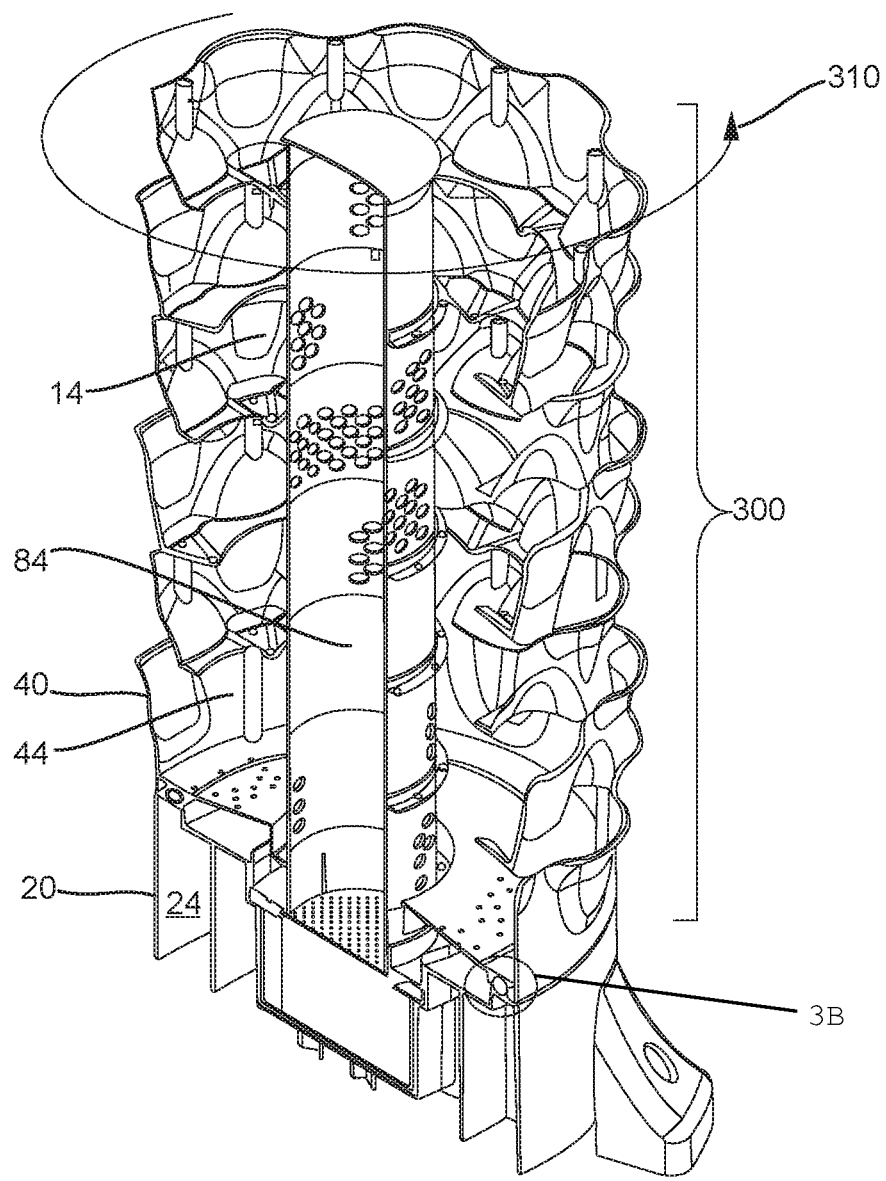
FIG. 3A is a perspective view of the garden container cross-sectional view of FIG. 2.

With reference to FIG. 2, the modular compost tube assembly 80 may have an open bottom 81 from which a cylindrical sidewall 82 formed from tube sections 90 (FIG. 18) extends vertically upward to an open top 83, said compost tube 80 being generally cylindrical in shape for example (or any other suitable shape), the longitudinal axis of said compost tube 80 being generally perpendicular to the bottom 81 of said compost tube assembly. The compost tube assembly top 83, bottom 81, and sidewall 82 define a compost tube assembly interior 84 (FIG. 3A). The compost tube assembly top 83 may then be capped, for instance by a removable cap 110 to keep out flies, etc.

Figure 3B:
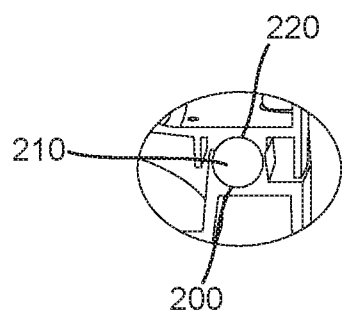
FIG. 3B is an enlarged view of a portion thereof.
Figure 4:
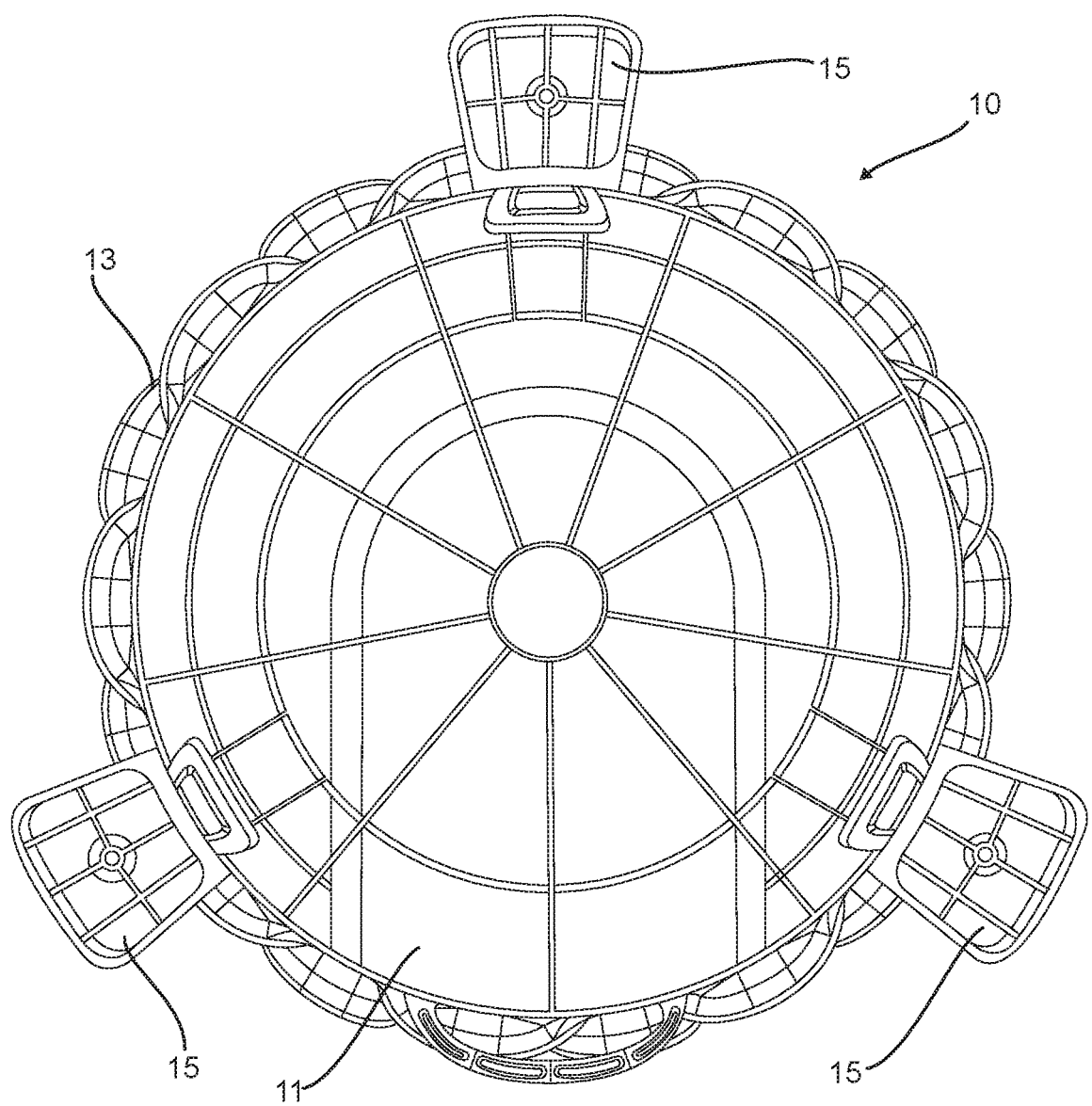
FIG. 4 is a bottom view of an example garden tower according to various example embodiments.
Figure 6:
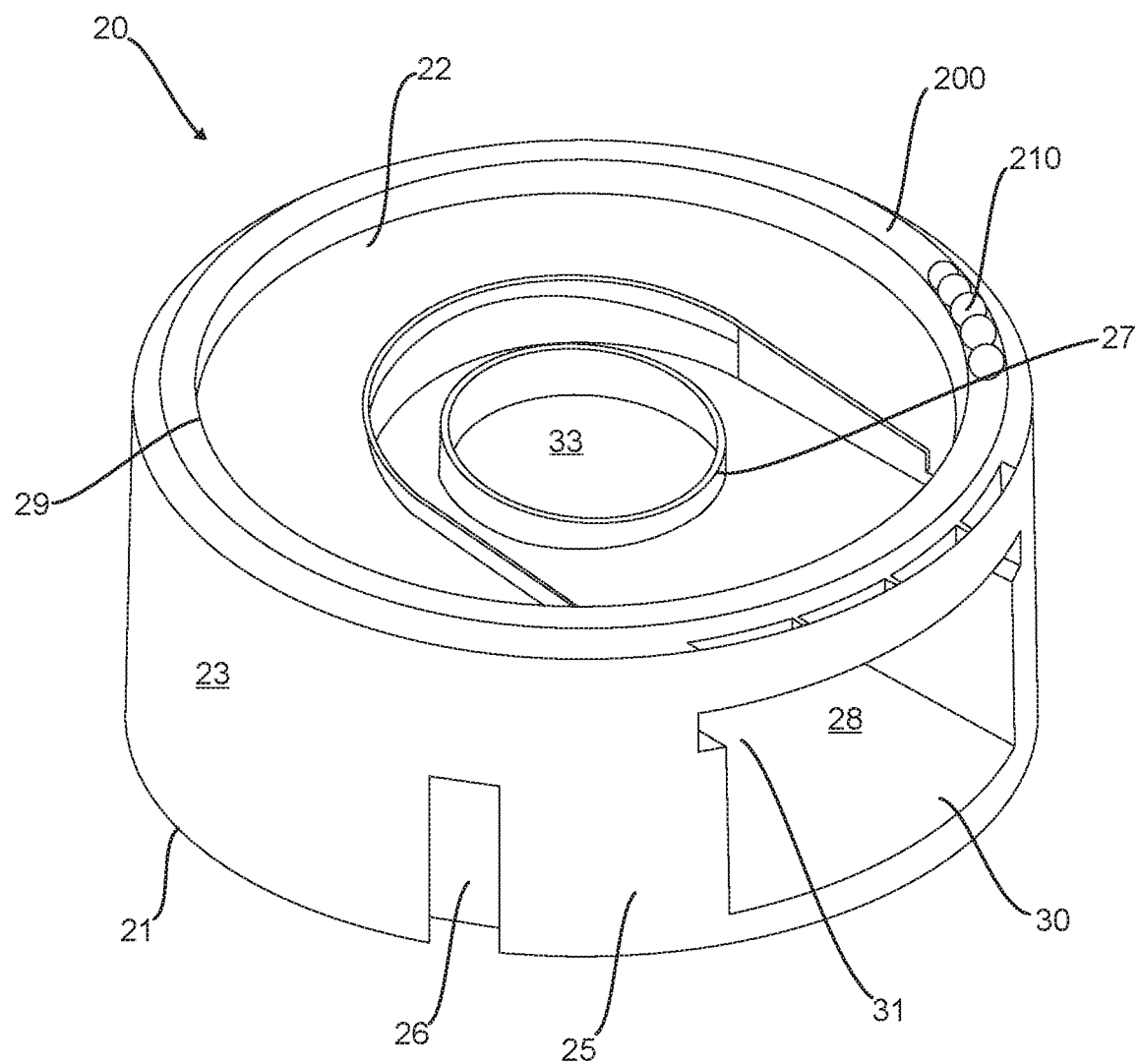
FIG. 6 is a perspective view of an example garden tower base according to various example embodiments.
Figure 7:
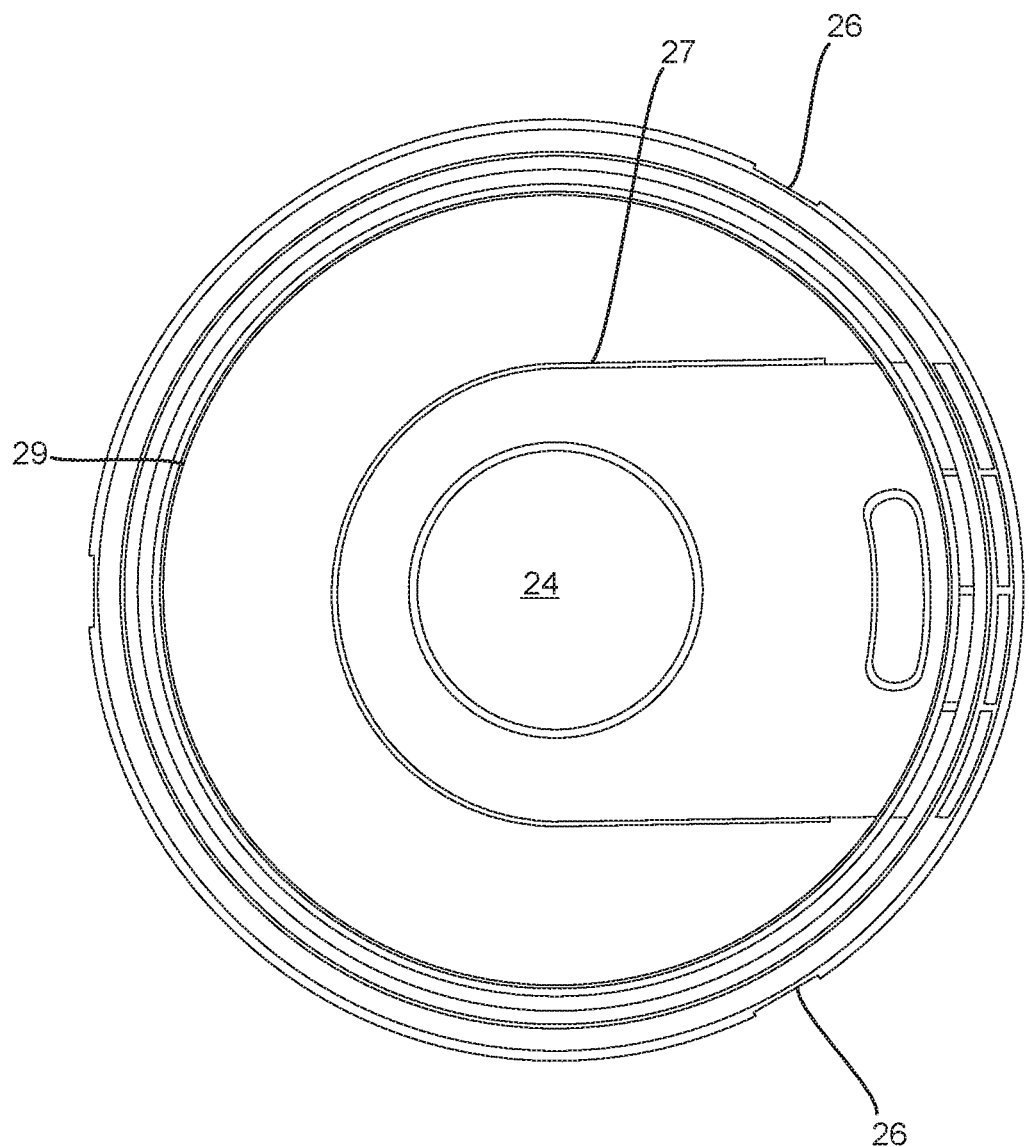
FIG. 7 is a top view of the example garden tower base of FIG. 6.
Figure 8:
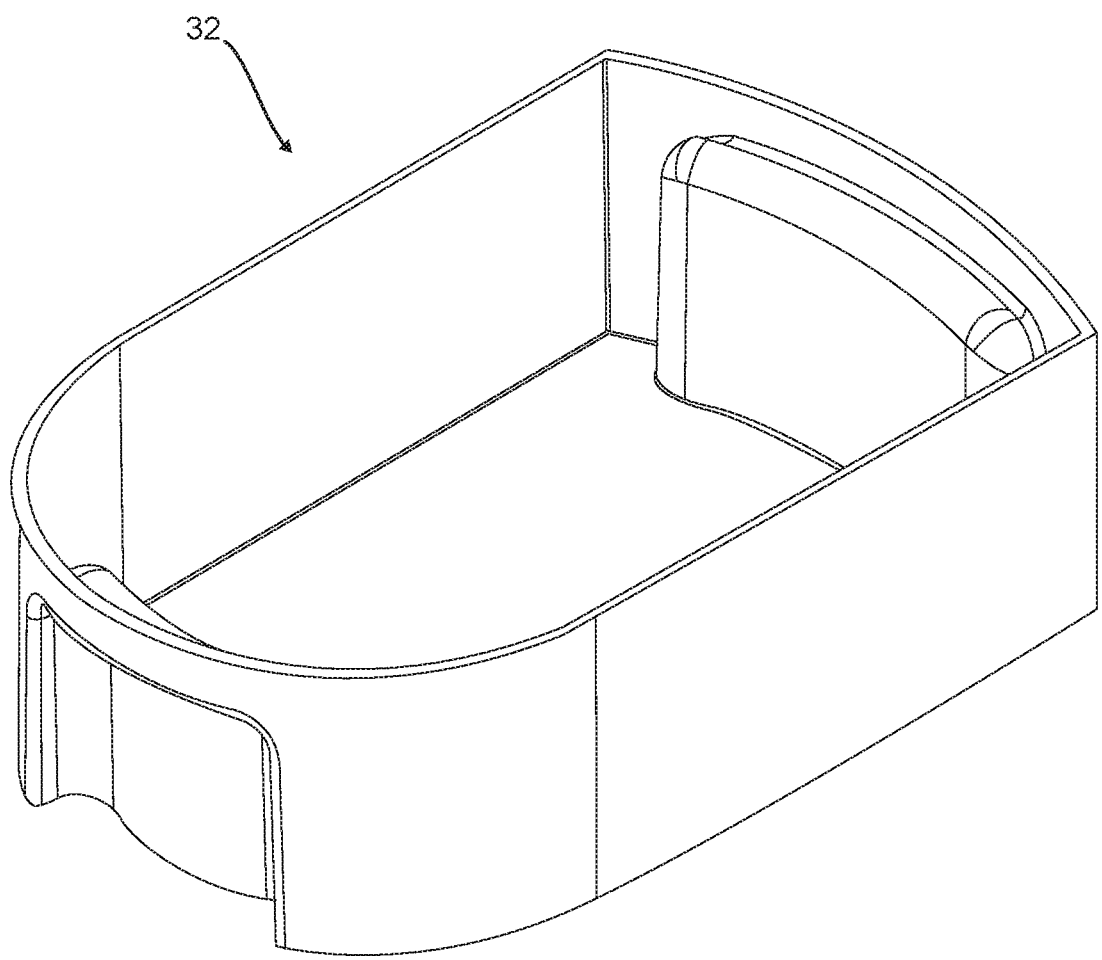
FIG. 8 is a perspective view of an example base drawer according to various example embodiments.
Figure 9:
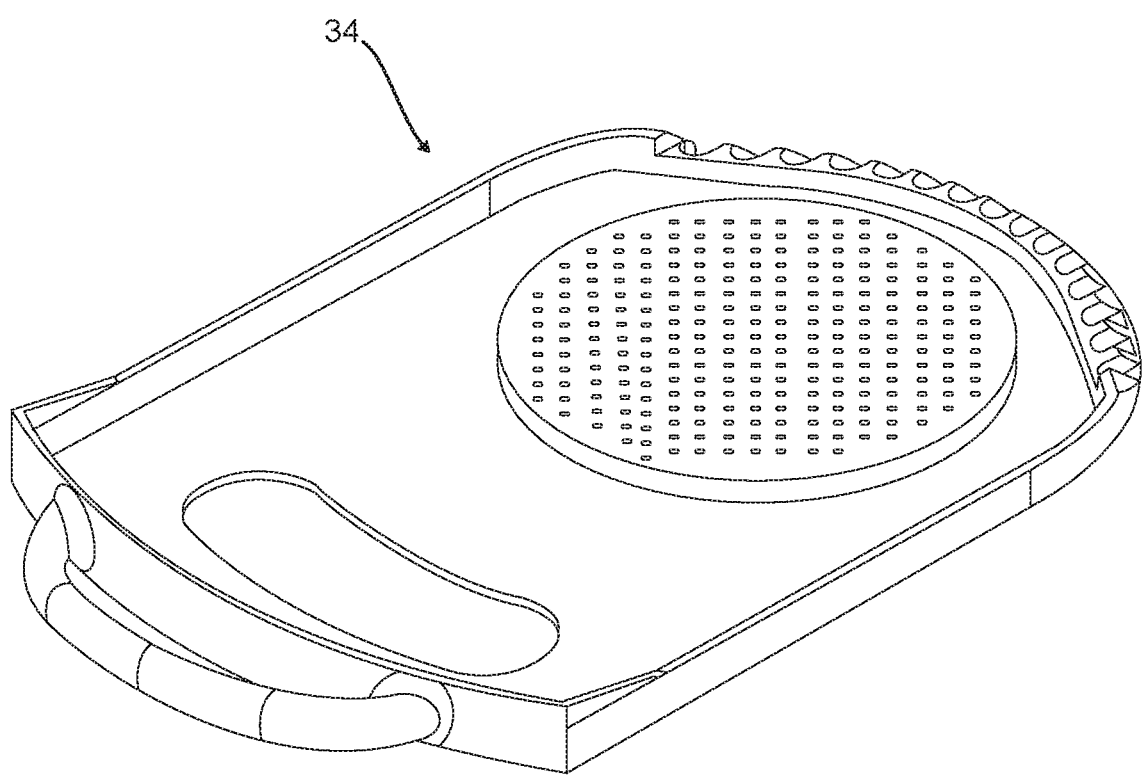
FIG. 9 is a perspective view of an example base filter screen according to various example embodiments.
Figure 10:
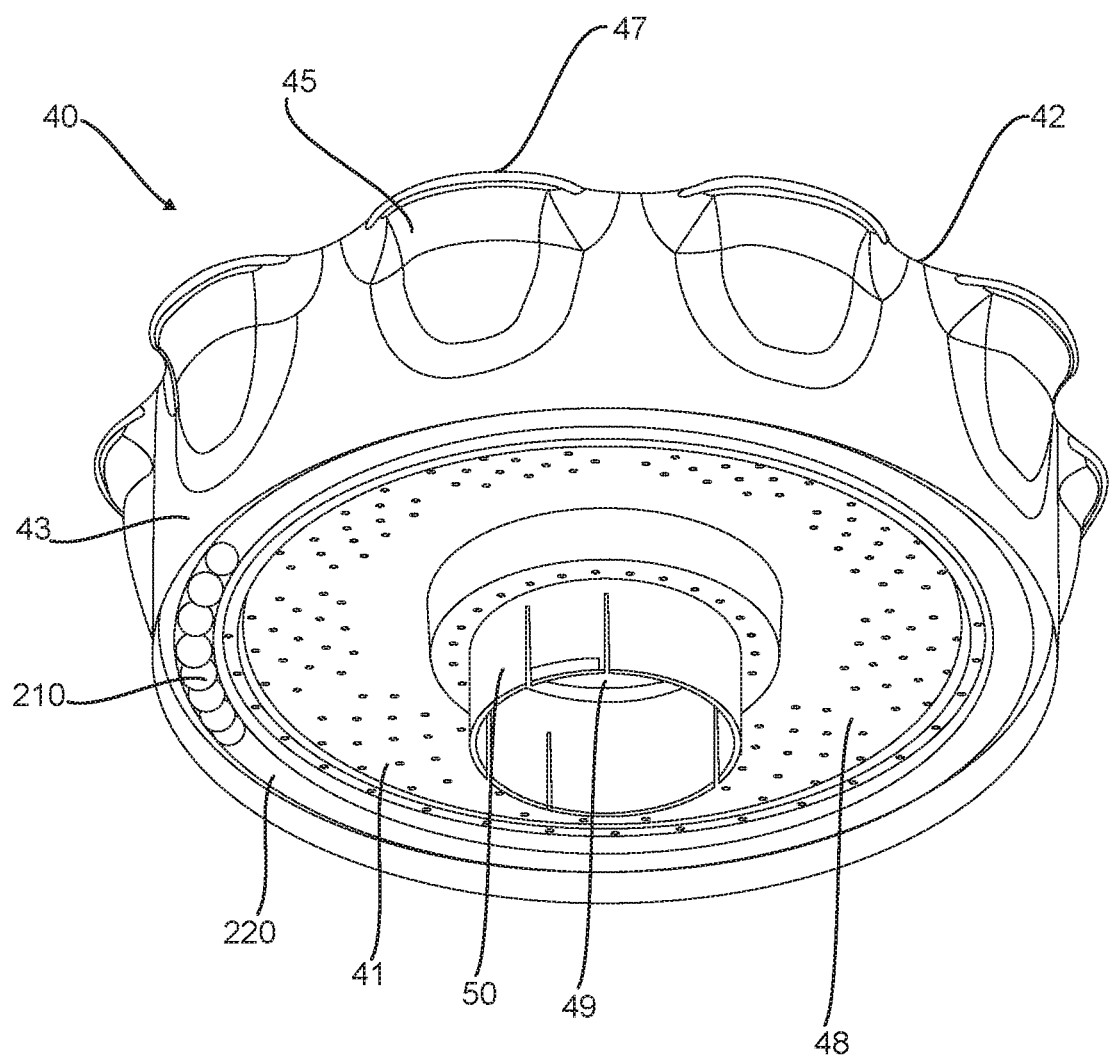
FIG. 10 is a bottom perspective view of an example bottom ring according to various example embodiments.

As indicated in FIGS. 3A and 3B, in various example embodiments the modular barrel assembly 10 may comprise the bottom ring 40 rotatably resting on said base 20, such that bottom ring 40, the one or more upper rings 60 stacked on bottom ring 40, and compost tube assembly 80 connected therewith (collectively the upper portion 300 of garden container 1 as indicated in FIG. 3A), are all able to rotate together about their longitudinal axis relative to the base 20, as indicated by arrow 310 (and may also be rotated in the direction opposite arrow 310). This would allow a user to rotate the upper portion 300 of the garden container 1 to access its full perimeter, for example when the garden container 1 is located in a corner. Bottom ring 40 may be rotatably connected with base 20 by a plurality of ball bearings 210 or other rotatable or slidable members in rotational or slidable contact with a lower groove 200 formed in the base 20 while also being in rotational or slidable contact with an upper groove 220 formed in the bottom ring 40, as shown in FIGS. 3A, 6, and 10. Note that while FIGS. 6 and 10 each show only a few ball bearings 210 located in lower groove 200 and upper grove 220, respectively, it is understood that when the garden container 1 is assembled, the entire space between upper and lower grooves 200, 220 may be filled either partially or entirely with ball bearings 210 or other rotatable or slidable members.

Referring more particularly to FIGS. 6-9, an example barrel assembly base 20 may have a bottom 21 from which one or more sidewalls 23 extend vertically upward to a base top 22, said base 20 being generally cylindrical in shape for example (or any other suitable shape), the longitudinal axis of said base 20 being generally perpendicular to the bottom 21 of said base 20, said base assembly bottom 21, top 22, and side walls 23 defining therein a base interior 24. The base sidewalls 23 may have an external surface 25 with a plurality, for instance three or four, preferably equi-spaced vertical notches 26 formed therein. Each said notch 26 may be sized, shaped, and positioned to receive a barrel assembly foot 15. The base top 22 may have a raised central annular section 27 with an aperture 33 opening into a cavity 28 within the base interior 24. The base top central annular section 27 may be sized, shaped, and positioned to receive the compost tube assembly bottom 81. The base top 22 also may have an upwardly extending perimeter flange 29. The bottom of the barrel sidewalls 13 may be sized, shaped, and positioned to fit over the base top perimeter flange 29. The base sidewall 23 may have a radial opening 30 extending into a base interior cavity 31. The base 20 may further comprise an open-top drawer 32 (FIG. 8) sized, shaped, and positioned to slide through the base sidewall radial opening 30 into the base interior cavity 31. The base 20 may further comprise a screen element 34 (FIG. 9) slidably insertable into the base interior cavity 31 through the radial opening 30 above the drawer 32.

Figure 11:
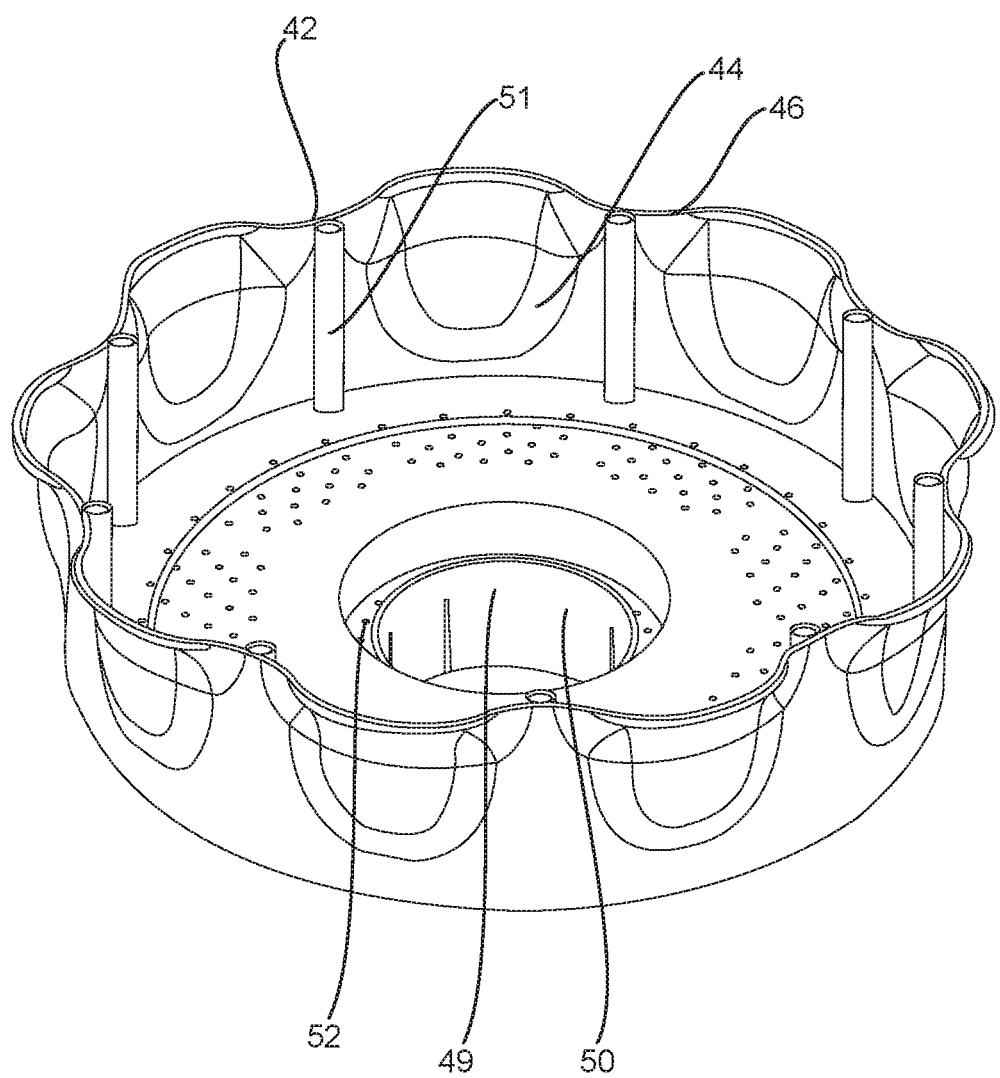
FIG. 11 is a top perspective view of the example bottom ring of FIG. 10.
Figure 12:
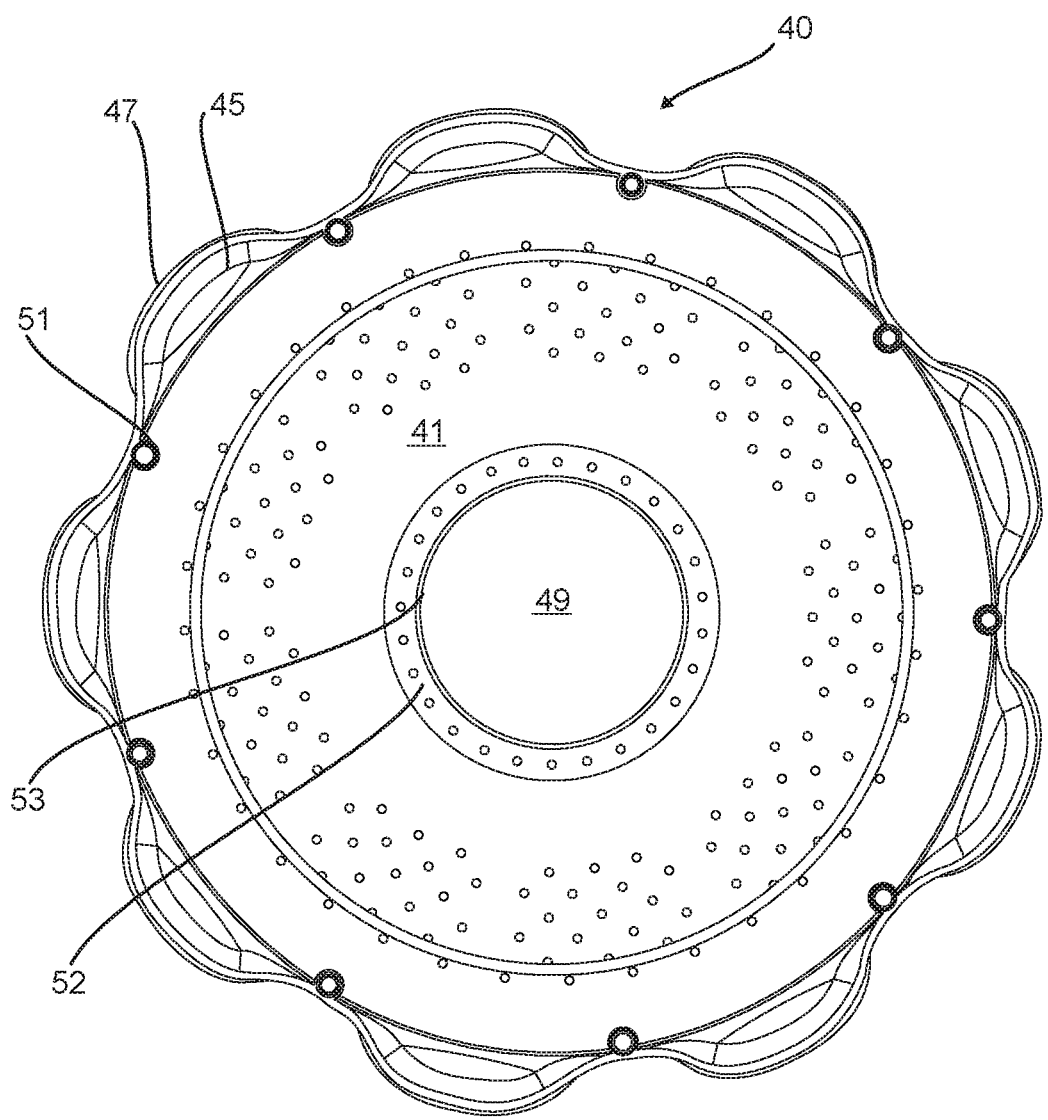
FIG. 12 is a top view of the example bottom ring of FIG. 10.
Figure 13:
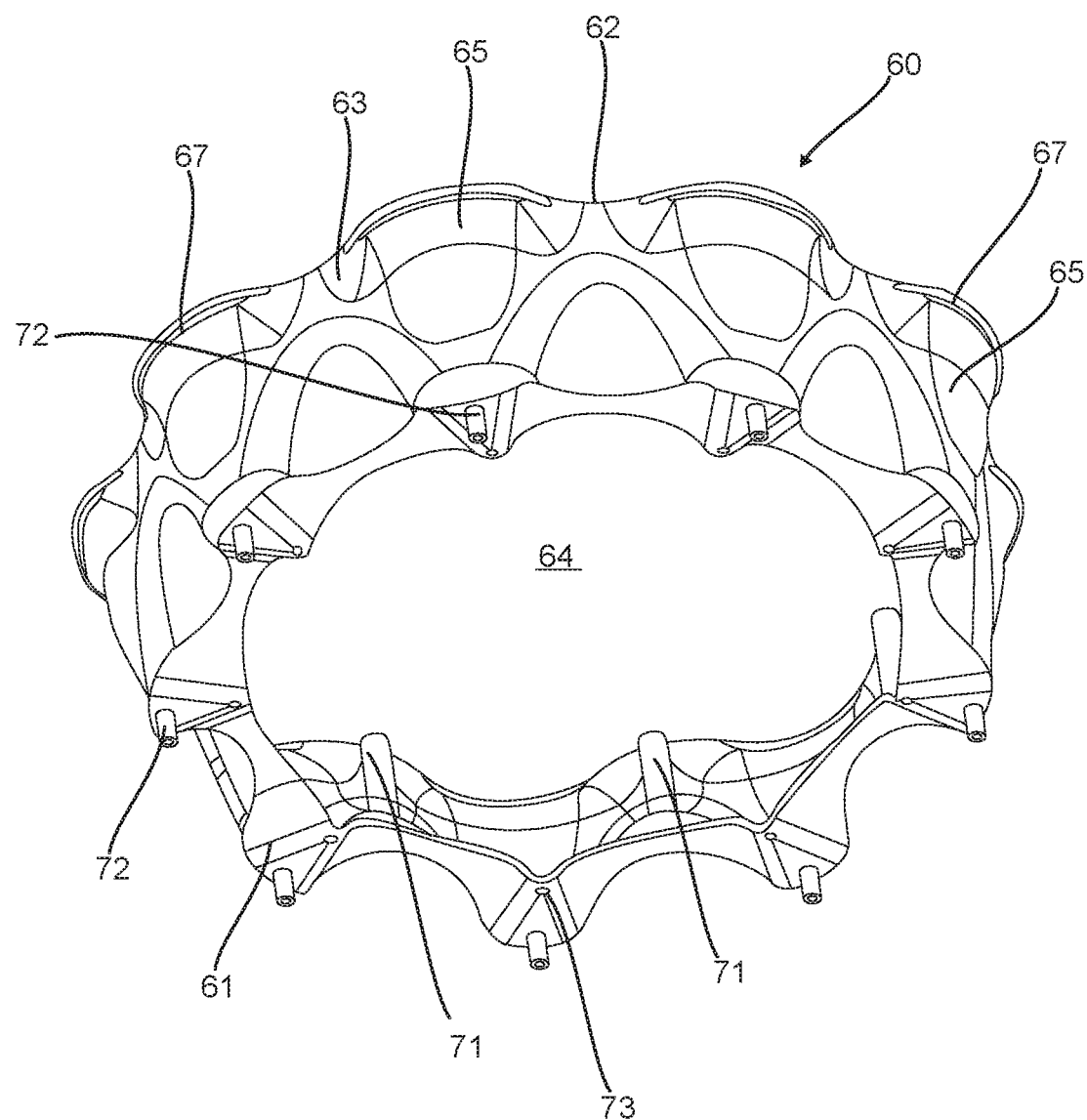
FIG. 13 is a bottom perspective view of an example upper ring with locators according to various example embodiments.
Figure 14:
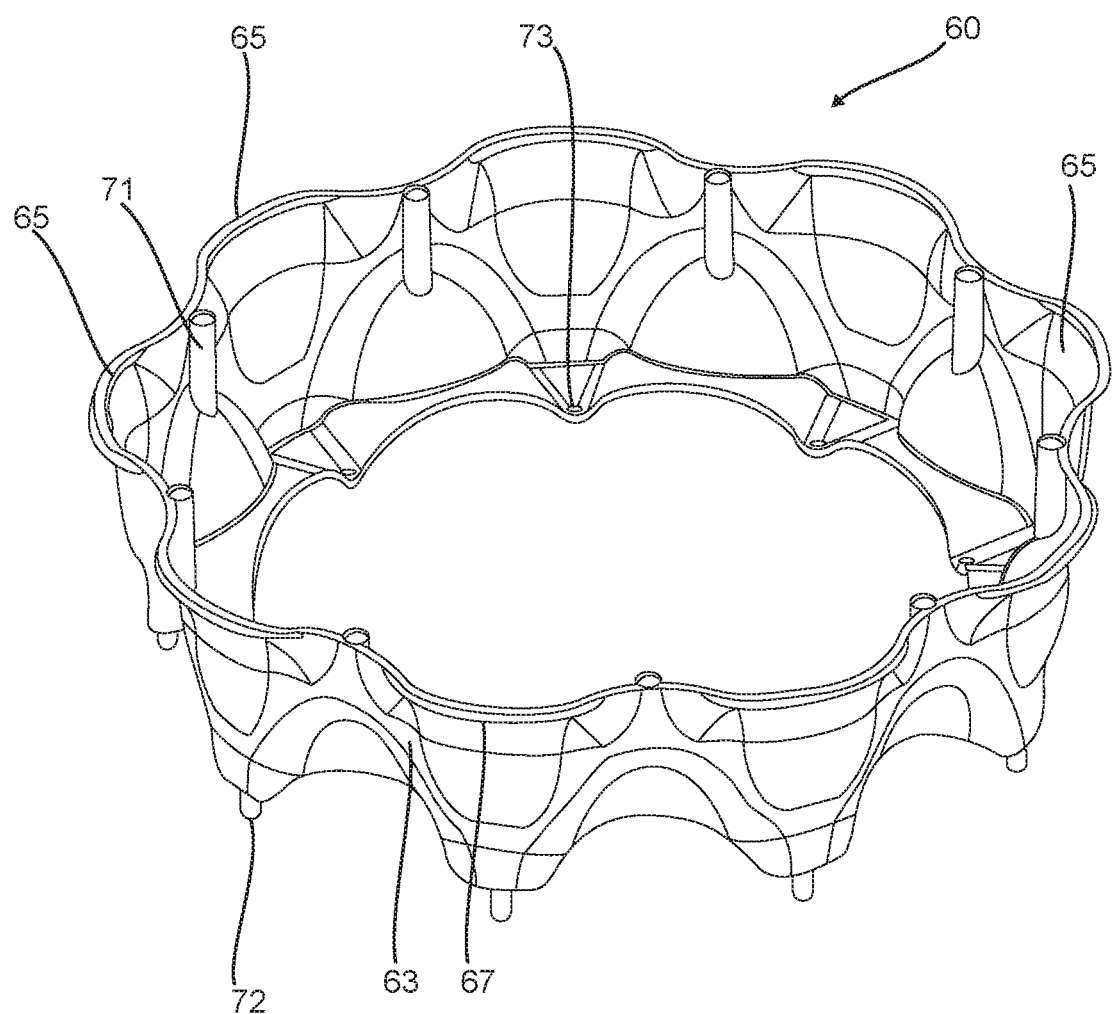
FIG. 14 is a top perspective view of the example upper ring of FIG. 13.
Figure 15:
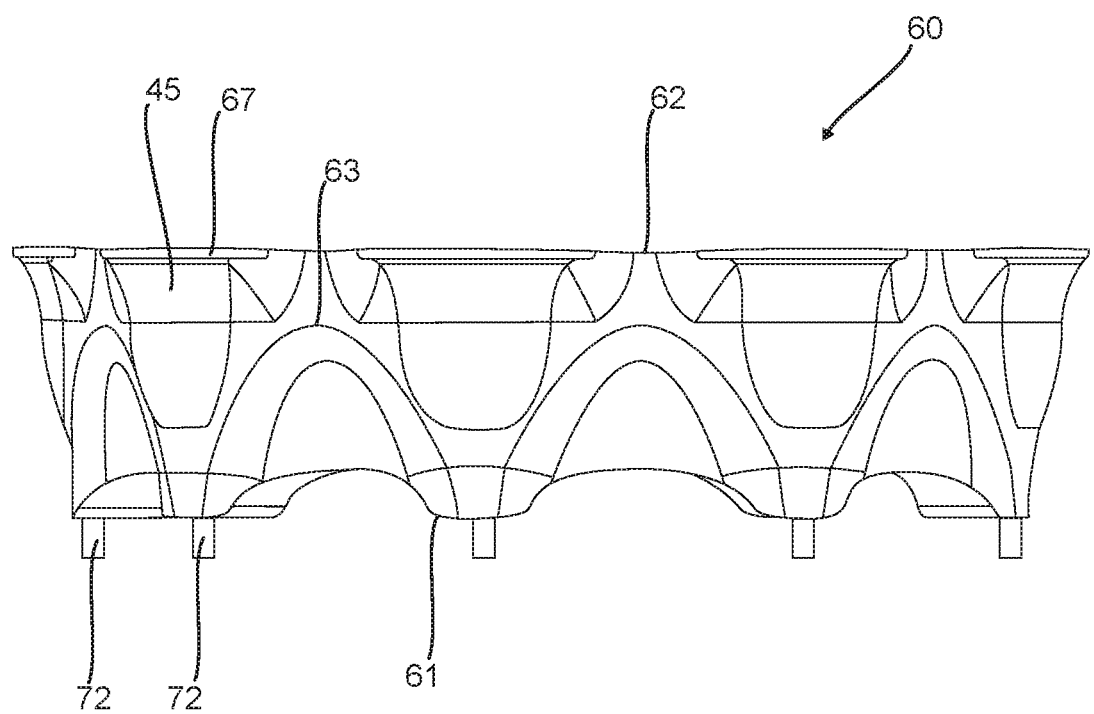
FIG. 15 is a side view of the example upper ring of FIG. 13.
Figure 16:
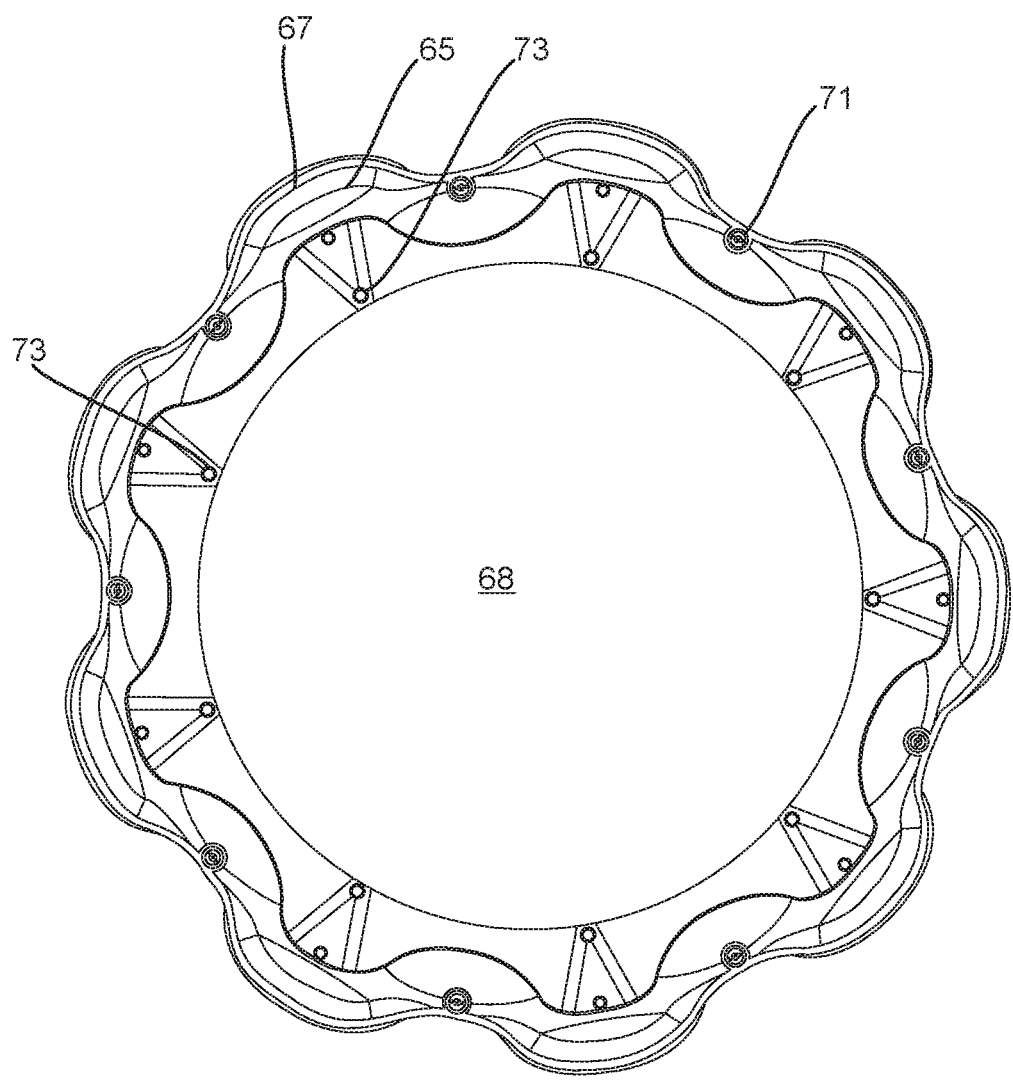
FIG. 16 is a top view of the example upper ring of FIG. 13.
Figure 17:
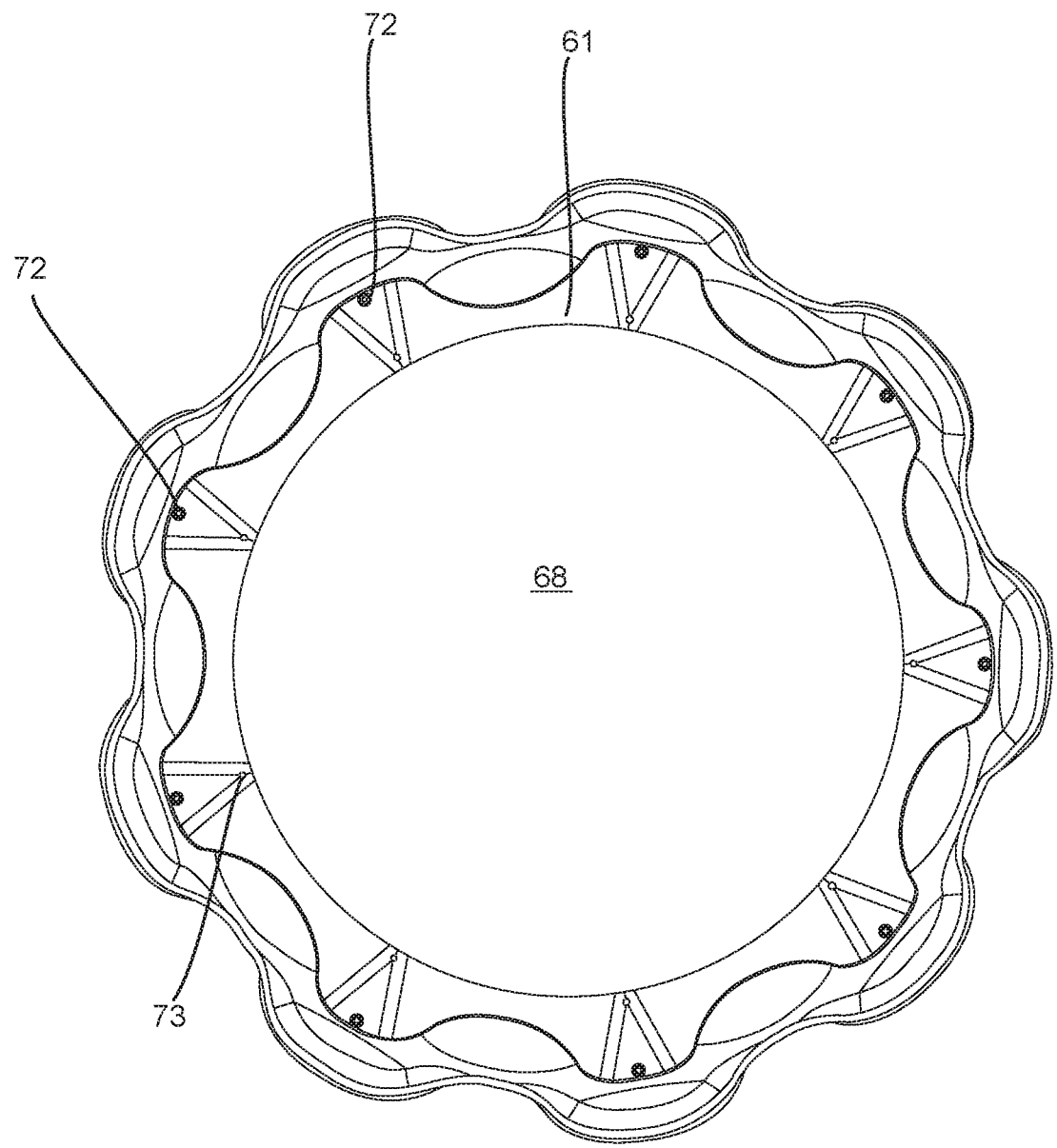
FIG. 17 is a bottom view of the example upper ring of FIG. 13.

As may be most clearly seen in FIGS. 10-12, the bottom ring 40 may form the lowest ring of the modular barrel assembly 10 and interface the modular barrel assembly 10 with the base 20. The bottom ring 40 may have a generally cylindrical shape for example (or any other suitable shape) with a bottom 41, open top 42, and one or more sidewalls 43 extending from said bottom 41 to said top 42, said bottom 41, top 42, and side walls 43 defining therein a base ring interior 44. The bottom ring sidewall 43 may have a plurality of generally circumferential, outwardly-extending protrusions 45 along the top edge 46 of the bottom ring sidewall. Each protrusion 45 may be defined by a lip 47. The bottom ring bottom 41 may have a plurality of perforations 48, a central, annular channel 52, and a central aperture 49 defined by said annular channel 52. The central aperture 49 may have a downwardly extending cylindrical sleeve 50. Said bottom ring sleeve 50 may be sized, shaped, and positioned to engage the base top central annular section 27. The bottom ring interior 44 may have a plurality of first engagement members 51, which may for example comprise hollow engagement cylinders 51 extending from the bottom ring bottom 41 along the bottom ring sidewall 43 to the bottom ring top 42. The first engagement members 51 may each be positioned between the bottom ring sidewall protrusions 45, adjacent the sidewall 43.

As may be most clearly seen in FIGS. 13-17, the upper rings 60 may form a substantial portion of the modular barrel assembly 10. The number of upper rings 60 may be varied to determine the overall height of the garden tower 1. A first upper ring 60 may rest on the bottom ring 40 (or the base 20) and each subsequent upper ring 60 may rest on the previously installed upper ring 60. Each upper ring 60 may have a generally cylindrical shape, for example (or any other suitable shape) with a bottom 61, open top 62 and one or more sidewalls 63 extending from said bottom 61 to said top 62, said bottom 61, top 62, and sidewalls 63 defining therein an upper ring interior 64. Each upper ring sidewall 63 may have a plurality of generally circumferential, outwardly-extending protrusions 65 along a top edge 66 of the upper ring sidewalls 63. Each protrusion 65 may be defined by a lip 67. Each upper ring bottom 61 may have a central, annular aperture 68 formed therein. The diameter of the aperture 68 may be substantial and may be, for example, approximately 75% or more of the diameter of the upper ring 60 itself.

Each upper ring interior 64 may have a plurality of second engagement members 71, which may for example comprise hollow engagement cylinders 71 extending from the upper ring bottom 61, along the upper ring sidewall 63 to the upper ring top 62. The second engagement members 71 may be each positioned between upper ring sidewall protrusions 65, adjacent the sidewall 63. Each upper ring bottom 61 also may have a plurality of engagement elements 72 protruding downwardly. Each engagement elements 72 may, for example, be positioned adjacent junctures between the bottom 61 and sidewall 63 beneath a protrusion 65. Each upper ring bottom 61 also may have a plurality of holding elements 73, such as small apertures 73 positioned adjacent the circumference of the bottom central aperture 68 in a radial line from the engagement elements 72.

Figure 18:
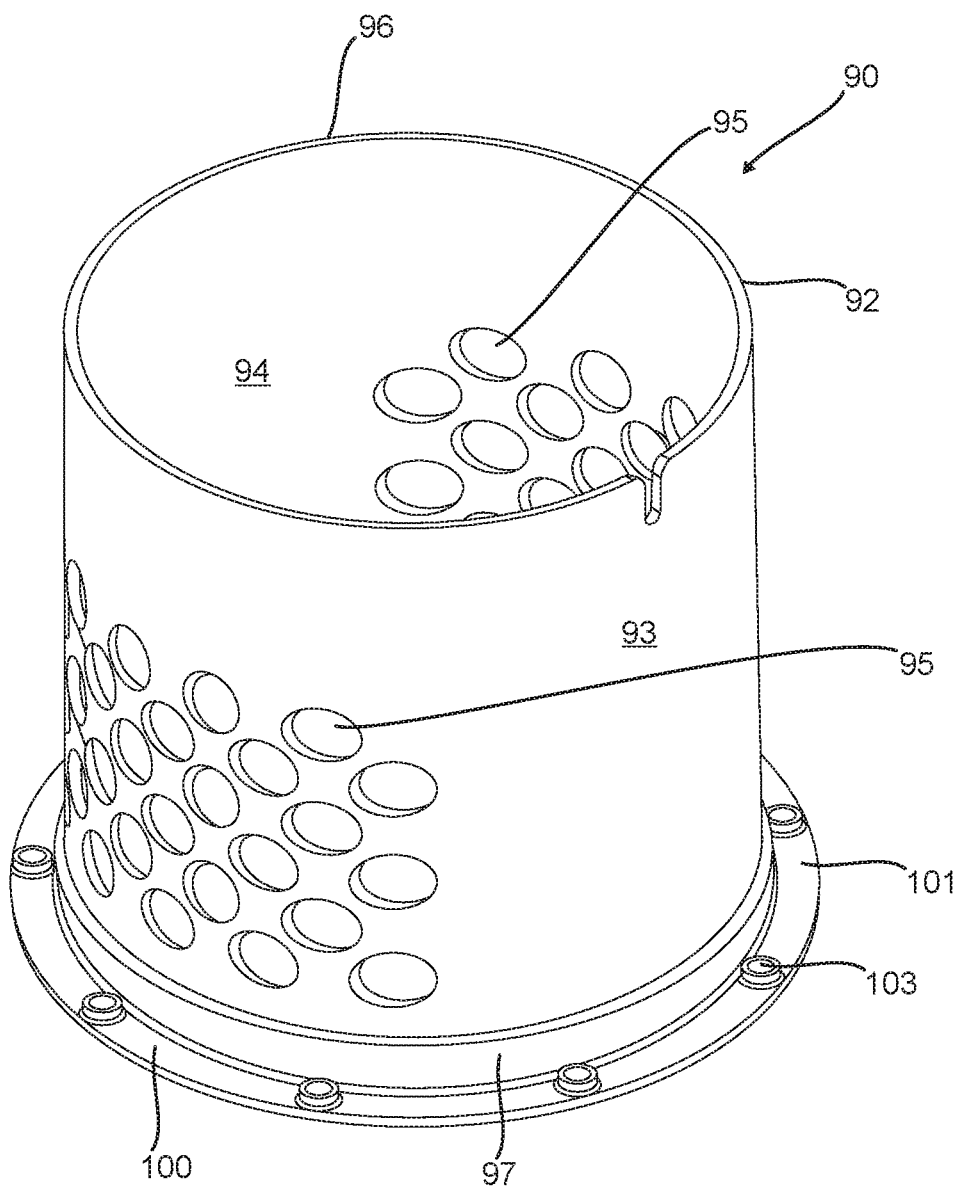
FIG. 18 is a perspective view of an example center tube section according to various example embodiments.
Figure 19:
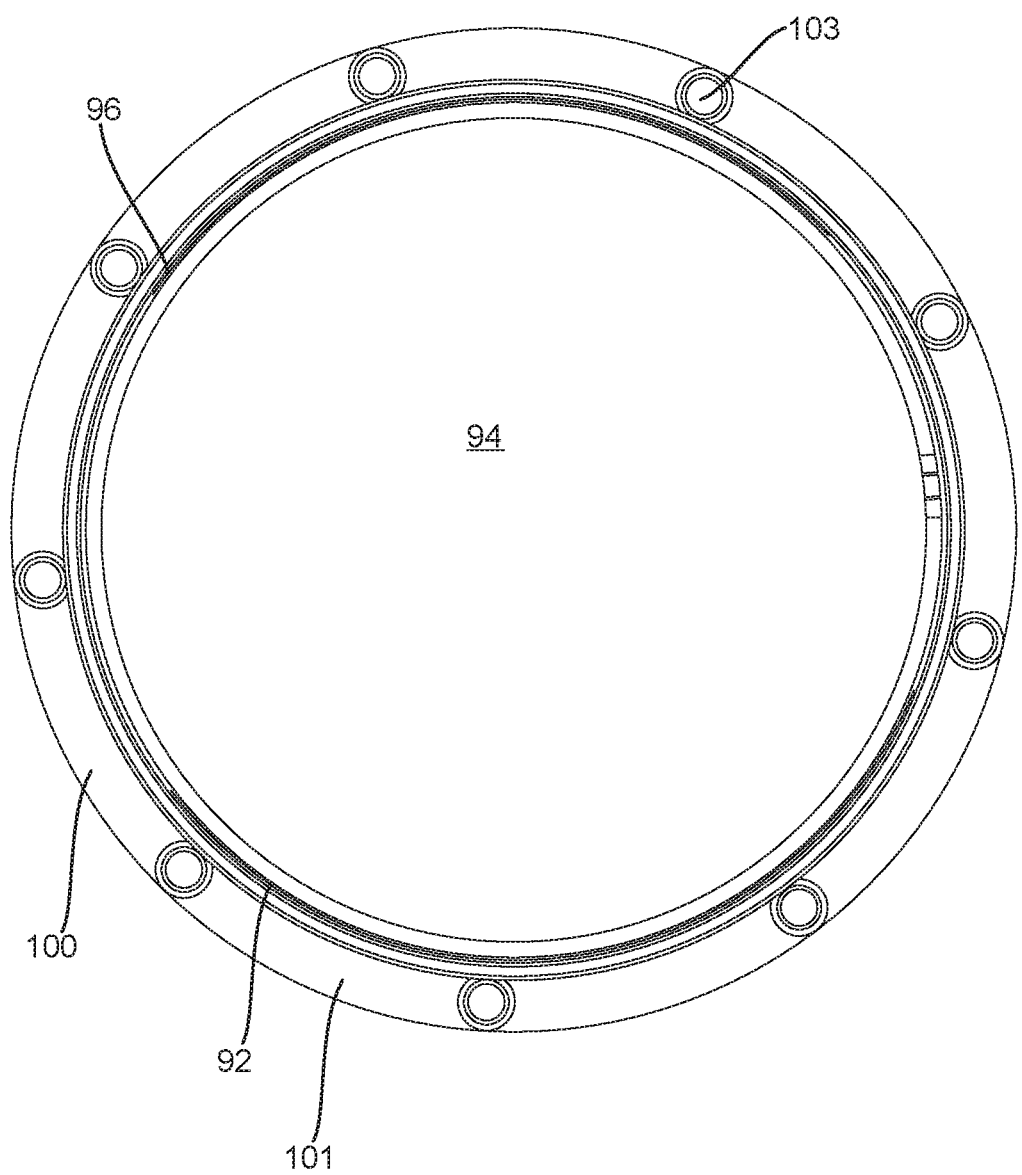
FIG. 19 is a top view of the example center tube section of FIG. 18.
Figure 20:
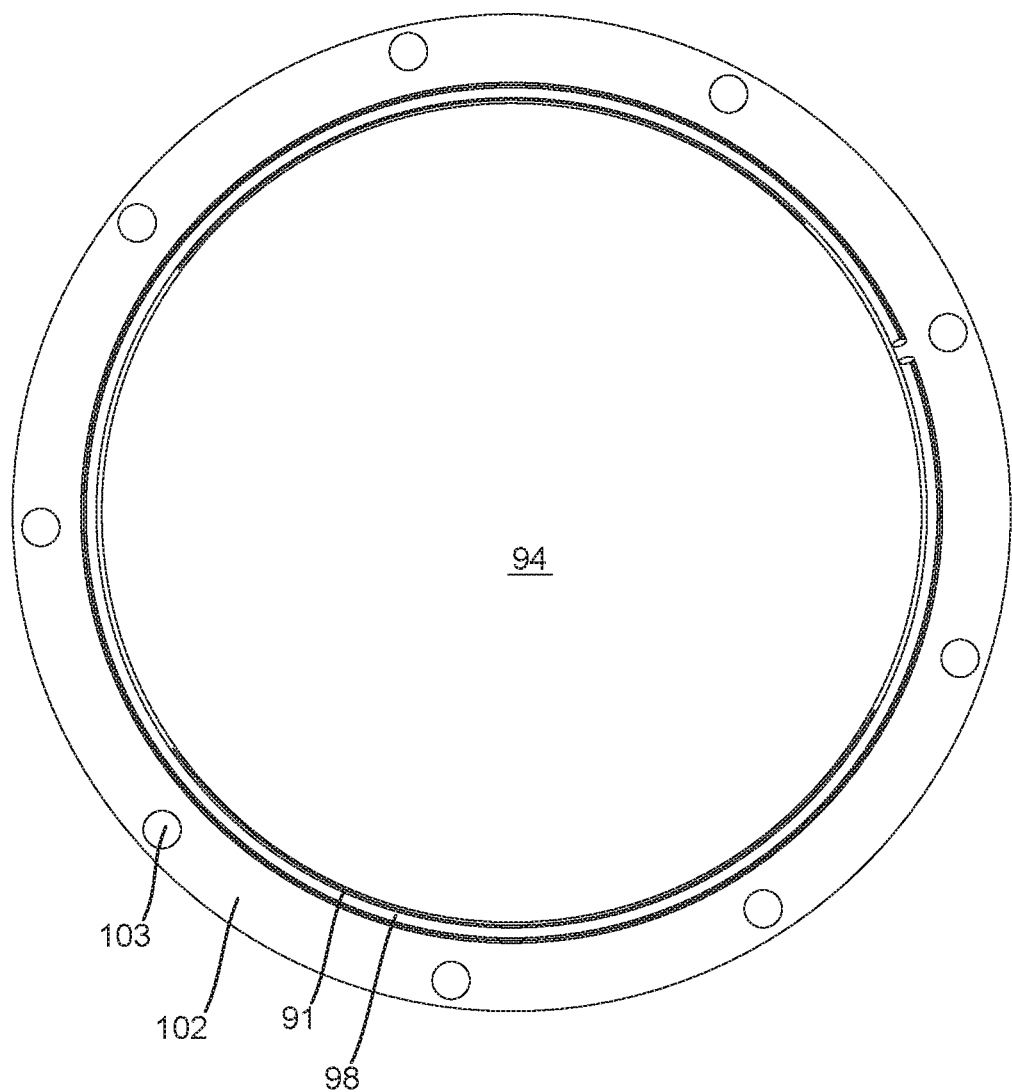
FIG. 20 is a bottom view of the example center tube section of FIG. 18.

As may be most clearly seen from FIGS. 18-20, the modular compost tube assembly 80 may comprise a plurality of tube sections 90 and a cap 110. In various example embodiments, the number of tube sections 90 may correspond to the combined number of bottom ring 40 and upper rings 60. Each tube section 90 may have a generally cylindrical shape, for example (or any other suitable shape) with an open bottom 91, open top 92 and one or more sidewalls 93 extending from said bottom 91 to said top 92, said bottom 91, top 92, and side walls 93 defining therein a tube section hollow interior 94. Each tube section sidewall 93 may have a plurality of apertures 95 formed therein. Each tube section sidewall 93 may have a bottom sidewall section 97 formed therein, said bottom sidewall section 97 having a diameter greater than the main sidewall 93. The greater diameter of the bottom sidewall section 97 may form an annular channel 98 sized, shaped, and positioned to receive the top edge 96 of a tube section sidewall 93 of an adjacent tube section 90.

At each tube section bottom 91, the tube section bottom sidewall section 97 may terminate in a radial, outwardly protruding, ring flange 100. Each ring flange 100 may have a top surface 101 and a bottom surface 102. Each ring flange also may have a plurality of equi-spaced apertures 103 extending through said top and bottom surfaces.

The bottommost tube section 90 may be positioned on the bottom ring 40 wherein the bottommost tube section ring flange 100 rests in the bottom ring central annular channel 52 and the tube section bottom sidewall section annular channel 98 may fit over the bottom ring central annular channel innermost radial ridge 53 defining the bottom ring central annular channel 52 and central aperture 49.

Figure 22:
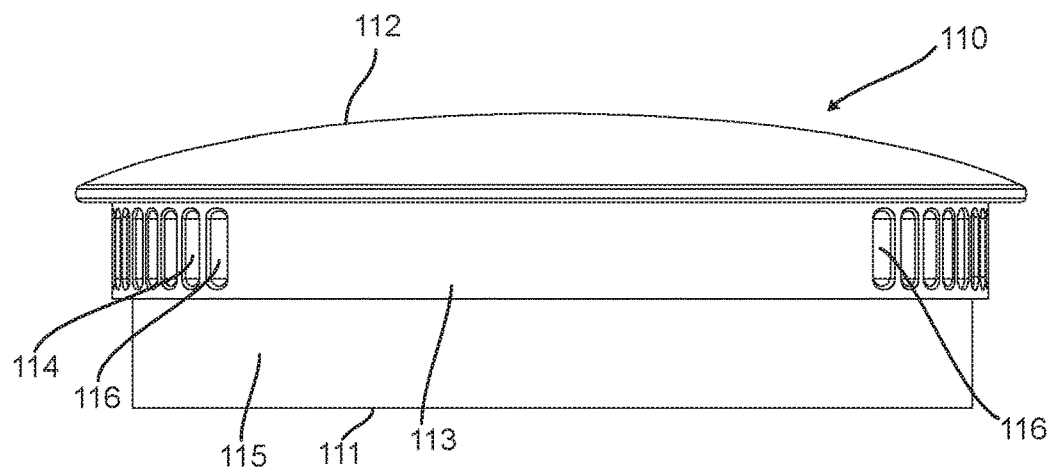
FIG. 22 is a side view of the example center tube cap of FIG. 21.

Referring more particularly to FIGS. 21-22, each garden tower 1 may be provided with a compost tube assembly cap 110. The cap 110 may have a generally cylindrical shape, for example (or any other suitable shape) with an open bottom 111, closed top 112, and one or more sidewalls 113 extending from said bottom 111 to said top 112, said bottom 111, top 112, and sidewalls 113 defining therein a cap hollow interior 114. An annular channel 115 may be formed about the cap sidewalls 113 adjacent the cap bottom 111. A plurality of vent apertures 116 may be formed in the sidewalls 113 above the channel 115 near the cap top 112. The cap 110 may be sized, shaped, and positioned to be inserted into the uppermost tube section 90 wherein the cap sidewall bottom 111 may be inserted through the tube section top 92. The cap sidewall channel 115 may engage the tube section interior 94. The remainder of the cap side wall 113 may rest on the tube section top 92.

Figure 5:
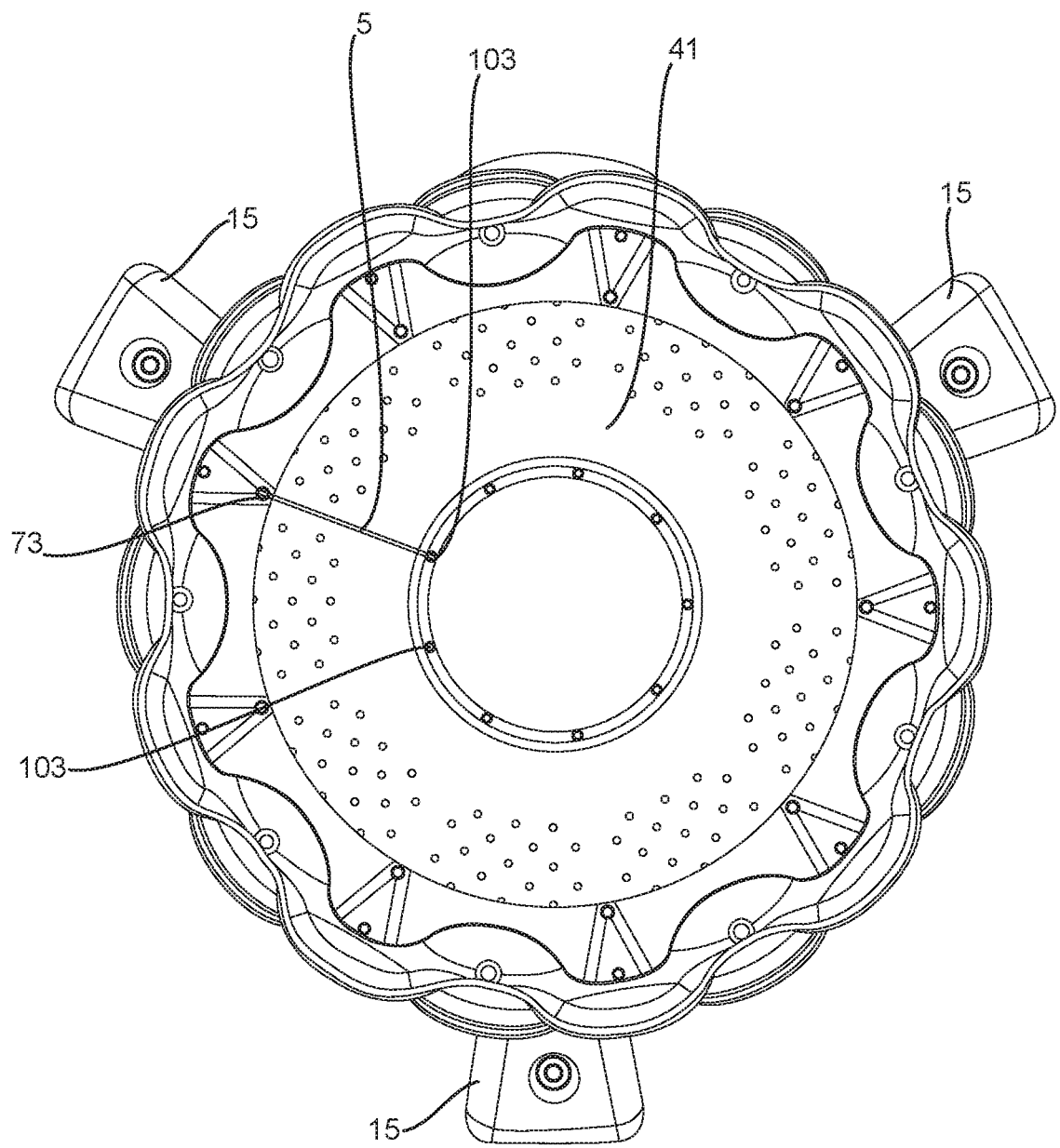
FIG. 5 is a top view of an example garden tower according to various example embodiments, shown without a compost tube cap.
Figure 23:
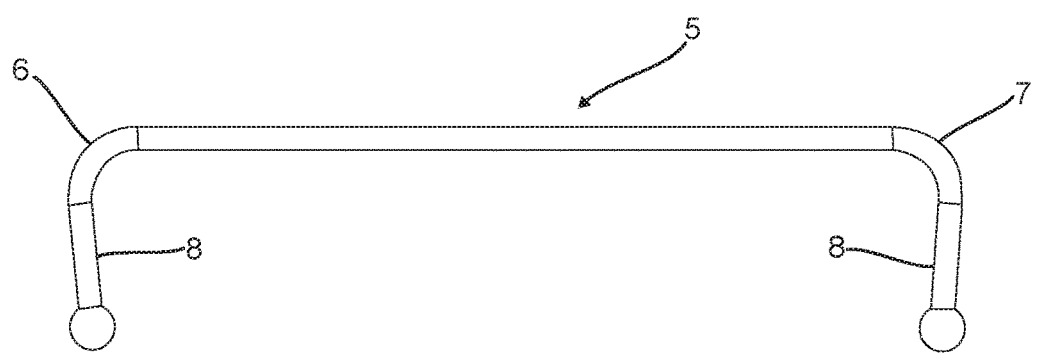
FIG. 23 is a side view of an example holding strut according to various example embodiments.

Referring to FIGS. 5 and 23, there is shown a linear holding strut 5 with two ends 6, 7, each end terminating in a holdable element 8, for instance an approximate ninety degree downward element 8. Each strut may be sized, shaped, and positioned to have one end 6 or 7 inserted into an upper ring holding aperture 73 and the other end 7 or 6 inserted into a corresponding tube section ring flange aperture 103. A plurality of the struts 5 so inserted in corresponding apertures 73, 103 may provide lateral stability to the garden tower 1, holding the modular compost tube assembly 80 concentrically within the modular barrel assembly 10. While one example holding strut 5 is shown in FIGS. 5 and 23, holding strut 5 may comprise any suitable structure having any suitable geometry or mechanical properties, as long as a plurality of the holding struts 5 are able to removably connect the compost tube assembly 80 with the garden tower 1 and securely locate the compost tube assembly 80 relative to the tower 1, for instance by connecting the compost tube assembly 80 with modular vertical outer cylindrical modular barrel assembly 10. For example, in one embodiment (not shown) holding struts 5 may comprise a plurality of zip-ties, wires, or other flexible members that may attach with and apply radial tension between an upper ring holding aperture 73 and a corresponding tube section ring flange aperture 103, for instance like spokes of a wheel.

Any suitable materials may be used for any of the components or pieces described herein, such as, for example, any suitable polymer or metal, or terracotta, ceramic, concrete, or wood, and any structure disclosed herein may be manufactured by any suitable means and may be solid or hollow. Ball bearings 210 may be steel or any other suitable material. While various example embodiments may have generally round cylindrical outer profiles for the rings 40, 60, the base 20, and the tube sections 90, as shown in the Figures, any or all of these components could alternatively have any other suitable shape, such as square, rectangular, octagonal, or any other suitable outer profile (when viewed from a top plan view, such as FIG. 5).

In use, an example modular composting garden container and system in the form of a garden tower 1 may be modularly assembled into any of a number of different heights by providing a base 20, and vertically stacking thereon any suitable number of rings 60, optionally including a bottom ring 40 specially sized, shaped, and positioned to interface with the base 20. As each ring 40 or 60 is stacked and removably secured together with attachment means such as the engagement members 71 and elements 72 described herein, a modular compost tube assembly 80 may also be step-wise assembled by stacking and removably securing together tube sections 90, the modular compost tube assembly 80 likewise being stacked upon the base 20 or bottom ring 40, concentrically within the rings 60. As each ring 40 or 60 is stacked together and as each tube section 90 therein is stacked together, each tube section 90 may be radially connected with a vertically corresponding ring 40 or 60 by a plurality of connecting struts 5, which may be equi-spaced around a perimeter of each tube section 90. Legs 15 may be installed extending radially outward from the base 20 to provide additional stability. A base drawer 32 may be removably installed in the base 20, and a screen element 34 may be removably installed in the base 20 between the bottom of the modular compost tube assembly 80 and base drawer 32. A cap 110 may be removably placed on the uppermost tube section 90. All of the above steps may be reversed and repeated to repeatedly assemble and disassemble the modular system 1, for example by hand without tools, as would be apparent to persons of skill in the art from the Figures.

When disassembled, various components of the modular composting garden container and system 1 may be designed to be vertically stacked in a nesting fashion for maximum density and minimum volume. For example, rings 60 and tube section 90 may comprise thin exterior walls tapered along their vertical axis to stack within like parts. For instance, the bottom of each disassembled piece may be sized, shaped, and positioned to be slid into the top opening of another like disassembled piece, like a stack of plastic drinking cups. This facilitates compact packaging for efficient storage, shipment, and retail display.

Once assembled, the modular compost tube assembly 80 may be filled with compost material such as vegetable and fruit scraps. One cup of worms may also be added. The barrel interior 14 between the barrel sidewall 13 and the compost tube assembly 80 may be filled with a growing medium such as potting soil. Starter plants may be added in each of the ring protrusions 45, 65. Water may be added to the modular compost tube assembly 80 and modular barrel assembly 10. The compost tube sidewall apertures 95 allow the worms to travel between the compost tube 80 and the potting soil. The worms feed on the compost material and leave worm castings (nutrient rich excrement) behind. The unused water collects vital nutrients as it passes through compost worm castings, becoming "worm tea" and draining through the screen element 34 into the base drawer 32. The base drawer 32 containing the worm tea may then be opened or removed, and the worm tea may be then be reintroduced into the modular barrel assembly 10 by adding it to the normal watering cycle, thereby providing an organic fertilizer for the plants. When the modular compost tube assembly 80 is full, the user may remove a portion of the compost by removing the screen element 34 at the compost tube assembly bottom 81, and forcing a desired amount out the compost tube bottom into the drawer 32, which may be recovered and used in this or other planting environments.

It is understood that the above-described embodiment is merely illustrative of the application. Other embodiments may be readily devised by those skilled in the art, which will embody the principles of the invention and fall within the spirit and scope thereof.

What is claimed is:

1. A modular composting garden container system, comprising:
   a base;
   a bottom ring sized and shaped to be removably mounted above the base;
   a plurality of stackable rings sized and shaped to be removably assembled into a tower of selectable height and mounted above the bottom ring, the plurality of stackable rings each comprising a generally cylindrical body having an outer diameter, open top, a bottom with a centrally located first aperture having a size that is at least 75% of the outer diameter, and one or more sidewalls extending from said bottom to said top, said one or more sidewalls defining a plurality of generally circumferential, outwardly-extending protrusions along a top edge of said one or more sidewalls, the tower comprising a first interior sized, shaped, and positioned to hold soil introduced from a top of the tower, and a first exterior surface defining second apertures between successively stacked ones of said stackable rings, the second apertures sized, shaped, and positioned to facilitate the growth of plants there through from the first interior, said second apertures having outer edges defined by said outwardly-extending protrusions;
   the plurality of stackable rings each comprising a plurality of first connecting members each positioned on said bottom centrally below one of the outwardly-extending protrusions of the stackable ring, and a plurality of second connecting members each positioned on said top centrally between adjacent outwardly-extending protrusions of the stackable ring, the first and second connecting members configured to rotationally orient and removably connect successively stacked ones of said stackable rings such that when the stackable rings are stacked and connected together, the outwardly-extending protrusions of each stackable ring are positioned centrally between the outwardly-extending protrusions of adjacent stackable rings;
   a plurality of stackable tube sections sized and shaped to be removably assembled into a hollow compost tube assembly of selectable height and mounted within the first interior of the tower and above the base, the hollow compost tube assembly comprising a second interior sized, shaped, and positioned to hold compost material introduced from a top of the compost tube assembly, and a second exterior surface defining second apertures therein sized, shaped, and positioned to facilitate the passage of worms there-through from the second interior;
   the base is sized, shaped, and positioned to receive, store, and provide access to nutrient-rich drainage from the soil or the compost material or both;
   the base further comprising: a drawer to provide access to the nutrient-rich drainage from the soil or the compost material or both; and an upper portion with an upward-facing annular groove formed therein proximate an outer perimeter of said upper portion;

the bottom ring comprising a lower portion with a downward-facing annular groove formed therein proximate an outer perimeter of said lower portion;

a plurality of rotatable bearings positioned between and adjacent the downward-facing annular groove and the upward-facing annular groove;

wherein the plurality of stackable rings, the bottom ring, and the plurality of stackable tube sections are configured to rotatably rest on the base, such that the plurality of stackable rings, the bottom ring, and the plurality of stackable tube sections are all able to rotate together relative to the base about a common longitudinal axis when the modular composting garden container system is assembled and the plurality of stackable rings are filled with soil, all without changing the position of the base or the drawer.

2. The modular composting garden container system of claim 1, further comprising:

a plurality of holding struts sized, shaped, and positioned to removably connect the compost tube assembly with the tower and to securely locate the compost tube assembly relative to the tower.

3. The modular composting garden container system of claim 1, further comprising:

wherein the base comprises a removable drawer sized, shaped, and positioned to receive, store, and provide access to nutrient-rich drainage from the soil or the compost material or both.

4. The modular composting garden container system of claim 1, further comprising:

a screen element removably installed in the base below the bottom of the modular compost tube assembly.

5. The modular composting garden container system of claim 1, further comprising:

the bottom ring sized, shaped, and positioned to rotatably connect the compost tube assembly with the base.

6. The modular composting garden container system of claim 1, further comprising:

a cap sized, shaped, and positioned to be removably attached with and cover a top of the compost tube assembly.

* * * * *